United States Patent [19]

Kersting et al.

[11] Patent Number: 5,344,885
[45] Date of Patent: Sep. 6, 1994

[54] PREPARATION OF PROPYLENE-ETHYLENE COPOLYMERS

[75] Inventors: Meinolf Kersting, Bad Durkheim; Juergen Kerth, Carlsberg; Klaus-Dieter Hungenberg, Birkenau; Patrik Mueller, Kaiserslautern; Peter Koelle, Ludwigshafen, all of Fed. Rep. of Germany

[73] Assignee: BASF Aktiengesellschaft, Ludwigshafen, Fed. Rep. of Germany

[21] Appl. No.: 22,086

[22] Filed: Feb. 25, 1993

[30] Foreign Application Priority Data

Feb. 29, 1992 [DE] Fed. Rep. of Germany ....... 4206369

[51] Int. Cl.$^5$ ............... C08F 4/76; C08F 210/02; C08F 210/06
[52] U.S. Cl. ................... 525/245; 525/268; 525/247; 525/323; 526/125; 526/138
[58] Field of Search ............... 525/245, 268, 247, 323; 526/125, 138

[56] References Cited

U.S. PATENT DOCUMENTS

| | | | |
|---|---|---|---|
| 4,454,299 | 6/1984 | Schweier et al. | 525/53 |
| 4,455,405 | 6/1984 | Jaggard et al. | 525/53 |
| 4,921,920 | 5/1990 | Collomb-Ceccarini et al. | 526/138 |
| 5,037,908 | 8/1991 | Tachikawa et al. | 526/138 |
| 5,147,928 | 9/1992 | Kerth et al. | 525/323 |

*Primary Examiner*—Vasu S. Jagannathan
*Attorney, Agent, or Firm*—Keil & Weinkauf

[57] ABSTRACT

Propylene-ethylene copolymers are obtained by two-stage polymerization from the gaseous phase in an agitated fixed bed by means of a Ziegler-Natta catalyst system that contains in addition to a titanium-containing solid component also an aluminum compound as cocatalyst, wherein as Ziegler-Natta catalyst system a system is used which, following the reaction of the titanium-containing solid component with the cocatalyst, is deactivated by reaction with carbon dioxide. The copolymers are used for producing fibers, films and moldings.

4 Claims, No Drawings

PREPARATION OF PROPYLENE-ETHYLENE COPOLYMERS

The present invention relates to a new process for preparing propylene-ethylene copolymers by two-stage polymerization from the gaseous phase in an agitated fixed bed by means of a Ziegler-Natta catalyst system that also contains, in addition to a titanium-containing solid component, an aluminum compound as co-catalyst.

The invention also relates to propylene-ethylene copolymers that can be obtained according to this process, their use in the production of fibers, films and moldings, and also fibers, films and moldings produced from these propylene-ethylene copolymers as essential components.

Processes for preparing propylene-ethylene block copolymers by using a Ziegler-Natta catalyst system have already been described in a number of patents, for example in U.S. Pat. No. 4,454,299 and in U.S. Pat. No. 4,455,405. However, the copolymers obtainable in this way exhibit an extremely high tendency to stress-whitening, by which is meant the white discoloration that occurs in many plastics in individual regions of the previously transparent specimens during stretching.

It is an object of the present invention to provide a process for preparing propylene-ethylene copolymers, copolymers having good mechanical properties and a good morphology being obtained.

We have found that this object is achieved by using as Ziegler-Natta catalyst system a system that, following the reaction of the titanium-containing solid component with the co-catalyst, is deactivated by reaction with carbon dioxide.

The process according to the invention can be carried out either batchwise or preferably continuously in the conventional reactors used for the polymerization of olefins. Suitable reactors include inter alia continuously operating stirred vessels, a plurality of stirred vessels connected in series generally being used. The reactors contain a fixed bed of finely particulate polymer, which is normally agitated by stirring.

The process can be carried out using the conventional Ziegler-Natta catalysts employed in polymerization technology. These catalysts contain inter alia, in addition to a titanium-containing solid component, a cocatalyst. As co-catalyst an aluminum compound is conveniently used. In addition to this aluminum compound, an electron donor compound is also preferably used as a further constituent of the co-catalyst.

In order to prepare the titanium-containing solid component, in general halides or alcoholates of trivalent or tetravalent titanium are used as titanium compounds, preference being given to chlorides of titanium, in particular titanium tetrachloride. The titanium-containing solid component preferably includes a finely particulate carrier, silicon and aluminum oxides and also aluminum silicates having proved suitable for this purpose. As a particularly preferred carrier $SiO_2 \cdot a\, Al_2O_3$ is used, a having a value from 0 to 2, in particular from 0 to 0.5.

Furthermore, among others compounds of magnesium are used in the preparation of the titanium-containing solid component. Suitable compounds are in particular magnesium halides, alkyl-magnesium and aryl-magnesium compounds, and also alkoxy-magnesium and aryloxy-magnesium compounds, preference being given to magnesium dichloride, magnesium dibromide and di-($C_1$–$C_{10}$-alkyl)magnesium compounds. In addition the titanium-containing solid component may also contain halogen, preferably chlorine or bromine.

Furthermore, the titanium-containing solid component also contains electron donor compounds, for example monofunctional or polyfunctional carboxylic acids, carboxylic acid anhydrides and carboxylic acid esters, and in addition ketones, ethers, alcohols, lactones, and also organophosphorus and organosilicon compounds. Preferably, as electron donor compounds within the titanium-containing solid component there are used phthalic acid derivatives of the formula I

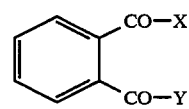

where X and Y are in each case a chlorine atom or a $C_1$–$C_{10}$-alkoxy radical or together are oxygen. Particularly preferred electron donor compounds are phthalic acid esters, X and Y being a $C_1$–$C_8$-alkoxy radical, for example a methoxy, ethoxy, propyloxy or butyloxy radical.

Furthermore, preferred electron donor compounds within the titanium-containing solid component are, inter alia, diesters of 3-membered or 4-membered, unsubstituted or substituted 1,2-cycloalkyldicarboxylic acids of the general formulae IIa and IIb, and also monoesters of unsubstituted or substituted 2-benzophenonecarboxylic acids of the formula III

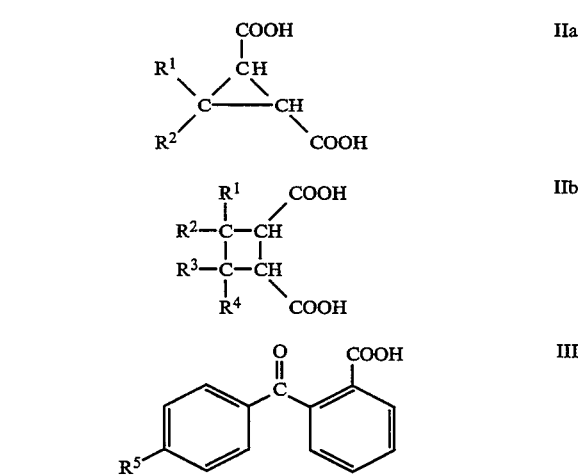

where $R^1$, $R^2$, $R^3$ and $R^4$ in the above formulae may be, independently of one another, a hydrogen atom, a $C_1$–$C_{15}$-alkyl group, a $C_7$–$C_{15}$-alkylaryl group or a 5-membered to 7-membered cycloalkyl group, which in turn may carry $C_1$–$C_{10}$-alkyl groups, and $R^5$ in formula III may be a hydrogen atom, a $C_1$–$C_5$-alkyl group, or a chlorine atom.

As hydroxy compounds the alcohols normally employed in esterification reactions are used for these esters, including inter alia $C_1$–$C_{15}$-alkanols, $C_5$–$C_7$-cycloalkanols, which in turn may carry $C_1$–$C_{10}$-alkyl groups, and also $C_6$–$C_{10}$-phenols.

The titanium-containing solid component may be prepared by methods known per se. Examples of such methods are described in, inter alia, EP-A 45 975, EP-A 45 977, EP-A 86 473, EP-A 171 200 and GB-A 2 111 066.

The following two-stage process is preferably employed in the preparation of the titanium-containing solid component.

In the first stage a solution of the magnesium-containing compound in a liquid alkane is first of all added to a finely particulate carrier, preferably $SiO_2.aAl_2O_3$, where a is a number in the range from 0 to 2, in particular in the range from 0 to 0.5, which carrier in general has a particle diameter of from 0.1 to 1000 μm, in particular from 10 to 300 μm, a pore volume of from 0.1 to 10 cm$^3$/g, in particular from 1.0 to 4.0 cm$^3$/g, and a specific surface of from 10 to 1000 m$^2$/g, in particular from 100 to 500 m$^2$/g, following which addition this mixture is stirred for 0.5 to 5 hours at a temperature of from 10° to 120° C. 0.1 to 1 mol of the magnesium compound is preferably used per mole of the carrier. A halogen or a hydrogen halide, in particular chlorine or hydrogen chloride, is then added in at least two-fold, preferably in at least five-fold molar excess based on the magnesium-containing compound, while stirring constantly. After about 30 to 120 minutes a $C_1$-$C_8$-alkanol, in particular ethanol, a halide or an alcoholate of trivalent or tetravalent titanium, in particular titanium tetrachloride, and also an electron donor compound, are added to this reaction product at a temperature of from 10° to 150° C. 1 to 5 mol of trivalent or tetravalent titanium and 0.01 to 1 mol, in particular 0.1 to 0.5 mol, of the electron donor compound are used per mole of magnesium of the solid obtained from the first stage. This mixture is stirred for at least one hour at a temperature in the range from 10° to 150° C., and the solid substance obtained is then filtered off and washed with a $C_7$-$C_{10}$-alkylbenzene, preferably with ethylbenzene.

In the second stage the solid obtained from the first stage is extracted for several hours at temperatures in the range from 100° to 150° C. with excess titanium tetrachloride or a solution, present in excess, of titanium tetrachloride in an inert solvent, preferably an alkylbenzene, the solvent containing at least 5% by weight of titanium tetrachloride. The product is then washed with a liquid alkane until the content of titanium tetrachloride in the wash liquid is less than 2% by weight.

The titanium-containing solid component obtainable in this way is used together with a co-catalyst as a Ziegler-Natta catalyst system. As co-catalyst, aluminum compounds are suitable.

Suitable aluminum compounds as co-catalyst are, in addition to trialkyl-aluminum, also compounds of this type in which an alkyl group has been replaced by an alkoxy group or by a halogen atom, for example by chlorine or bromine. Preference is given to trialkylaluminum compounds whose alkyl groups in each case have 1 to 8 carbon atoms, for example trimethyl-, triethyl- or methyldiethyl-aluminum.

In addition to the aluminum compound, as further co-catalyst there are also preferably used electron donor compounds such as monobasic or polybasic carboxylic acids, carboxylic acid anhydrides and carboxylic acid esters, and furthermore ketones, ethers, alcohols, lactones and also organophosphorus and organosilicon compounds. Preferred electron donor compounds are organosilicon compounds of the formula IV

$$R^6{}_nSi(OR^7)_{4-n} \qquad \text{IV}$$

where $R^6$ is a $C_1$-$C_{20}$-alkyl group, a 5-membered to 7-membered cycloalkyl group which in turn may carry a $C_1$-$C_{10}$-alkyl group, or a $C_6$-$C_{20}$-aryl or arylalkyl group, $R^7$ is a $C_1$-$C_{20}$-alkyl group, and n is 1, 2 or 3. Particularly preferred are those compounds in which $R^6$ is a $C_1$-$C_8$-alkyl group or a 5-membered to 7-membered cycloalkyl group, and $R^7$ is a $C_1$-$C_4$-alkyl group, and n is 1 or 2.

Among these compounds, particularly preferred are dimethoxydiisopropylsilane, dimethoxyisobutylisopropylsilane, dimethoxydiisobutylsilane, dimethoxydicyclopentylsilane and diethoxyisobutylisopropylsilane.

The individual catalyst constituents may be added individually in any order or as a mixture of two components to the polymerization system.

The preparation of the Ziegler-Natta catalyst systems that are used is generally performed by first of all reacting the titanium-containing solid component with the co-catalyst. The reaction is expediently carried out in the liquid phase. If the co-catalyst exists as a liquid at the reaction temperature, the reaction can be carried out with or without the use of solvents. If the co-catalyst exists as a solid at the reaction temperature, the use of an inert solvent is recommended.

Suitable solvents are liquid hydrocarbons, preferably $C_5$-$C_{10}$-alkanes, particularly preferably hexane or heptane, or mixtures of hydrocarbons.

The co-catalyst is reacted with the titanium-containing solid component at a temperature of from −20° to 60° C., preferably from 0° to 25° C. For this purpose the titanium-containing solid component is conveniently suspended in the co-catalyst or in the co-catalyst solution.

Preference is given to using those mixtures in which the molar ratio of aluminum compound to titanium from the titanium-containing solid component is 0.1:1 to 10:1, in particular 1:1 to 5:1, and the molar ratio of aluminum compound to organosilicon compound is 0.1:1 to 100:1, in particular 3:1 to 30:1.

The reaction time is up to three hours, preferably up to 30 minutes.

The Ziegler-Natta catalyst system activated by reaction with the co-catalyst is then reacted with dry carbon dioxide.

The reaction takes place at a temperature of from −20° to 60° C., preferably at from 0° to 25° C. The carbon dioxide may be added as a gas directly to the catalyst suspension. Carbon dioxide may also be added in solid form to the catalyst suspension. However, it is also possible to fill the gas space above the suspension with carbon dioxide, preferably at a pressure of from 1 to 30 bar, particularly preferably from 1 to 8 bar. This form of the reaction is preferred with carbon dioxide.

In order to accelerate the reaction the catalyst suspension can be stirred during the reaction with carbon dioxide.

The reaction normally takes up to 3 hours, and is preferably carried out in 0.5 to 3 hours.

The catalyst system is deactivated by the reaction with carbon dioxide, i.e. it is then generally no longer polymerization-active. The catalyst systems prepared in this way have a good storage stability and may be stored for example as solids.

Before they are used in a polymerization reaction the catalyst systems are reactivated by reaction with a co-catalyst.

As co-catalyst there may be used the same compounds as are used in the reaction with the titanium-containing solid component.

The co-catalysts are preferably used in an amount such that the atomic ratio of aluminum from the aluminum compound to titanium from the titanium-containing solid component is 10:1 to 800:1, in particular 20:1 to 200:1, and the molar ratio of the aluminum compound to the electron donor compound used as co-catalyst is 1:1 to 100:1, in particular 2:1 to 80:1.

The preparation of the propylene-ethylene copolymers by two-stage polymerization from the gaseous phase can be carried out by producing polypropylene in a first polymerization stage and then incorporating a mixture of propylene and ethylene by polymerization in a second stage, or by already producing a propylene-ethylene copolymer in the first stage, to which a mixture of propylene and ethylene is incorporated by polymerization in the second stage.

The polymerization is carried out in the first polymerization stage at a pressure of from 20 to 40 bar, at from 60° to 90° C. and with an average residence time of the reaction mixture of from 1 to 5 hours. Preferably, pressures are from 20 to 35 bar, temperatures are from 65° to 85° C., and average residence times are from 1.5 to 4 hours. The reaction conditions are chosen so that 0.05 to 2 kg, preferably 0.1 to 1.5 kg of polypropylene or propylene copolymer per millimole of the aluminum component are formed in the first polymerization zone. Preferably, in the first polymerization zone the ratio of the partial pressure of propylene to the partial pressure of ethylene is adjusted to 10:1 to 500:1, in particular to 15:1 to 100:1.

The polypropylene or propylene copolymer that can be obtained is removed, once the reaction has ended, together with the catalyst from the first polymerization stage and is introduced to the second polymerization stage, where a mixture of propylene and ethylene is polymerized on to the polymer. The pressure prevailing in the second polymerization stage is 7 bar, preferably 10 bar, below that of the first polymerization stage, and is 5 to 30 bar, preferably 10 to 25 bar. The temperature is from 30° to 100° C., preferably from 35° to 80° C., and the mean residence time of the polymer is 1 to 5 hours, preferably 1.5 to 4 hours.

In the second polymerization stage the ratio of the partial pressures of propylene to ethylene is in the range from 0.5:1 to 5:1, in particular in the range from 1:1 to 4:1. Preferably, the weight ratio of the monomers reacted in the first polymerization stage to those reacted in the second polymerization stage is adjusted so that it is in a range from 2.5:1 to 20:1, preferably in the range from 3:1 to 15:1, if polypropylene was produced in the first stage. In the case where a propyleneethylene copolymer was produced in the first stage, the weight ratio of the monomers reacted in the first polymerization stage to those reacted in the second polymerization stage is preferably in the range from 0.5:1 to 20:1, in particular from 0.6:1 to 10:1.

It may furthermore be advantageous to add to the reaction mixture of the second polymerization stage a $C_1$–$C_8$-alkanol, in particular a $C_1$–$C_4$-alkanol, which influences the activity of the Ziegler-Natta catalyst. Suitable alkanols for this purpose are, inter alia, methanol, ethanol, n-propanol, n-butanol, and most especially isopropanol. The amount of the $C_1$–$C_8$-alkanol that is added is conveniently chosen so that the molar ratio of the aluminum compound to the $C_1$–$C_8$-alkanol is 0.01:1 to 10:1, in particular 0.02:1 to 5:1.

The molecular weight of the polymers that can be obtained may be controlled as usual by adding regulators, in particular hydrogen. It is furthermore possible to co-use inert gases such as nitrogen or argon. The copolymers that are obtained may contain minor proportions of further alkenes, in general $C_4$–$C_{10}$-1-alkenes.

The mean molecular weights of the copolymers are from 10,000 to 500,000, and the melt flow indices are from 0.1 to 100 g/10 min, preferably from 0.2 to 10 g/10 min, in each case measured according to DIN 53 735 at 230° C. and under a load of 2.16 kg. The melt flow index corresponds to the amount of polymer that is expressed within 10 minutes from the standardized test apparatus according to DIN 53 735 at a temperature of 230° C. and under a load of 2.16 kg. The copolymers obtained have, in addition to a good notched impact strength, only very small catalyst residues and a very slight tendency to stress-whitening. From the process technology aspect it is also advantageous that the apparent densities of the copolymers extracted from the second polymerization stage are not less than those of the polymers obtained from the first polymerization stage. Furthermore, the homopolymers or copolymers prepared in the first polymerization stage have an extremely good morphology, i.e. few fine fractions in the homopolymers and few coarse grain fractions in the copolymers. If a homopolymer is prepared in the first stage, the catalyst system that is used exhibits, in the case of a high propylene-ethylene content in the second stage, a very good regulatory behavior, and in the presence of isopropanol leads to a high rubber-forming potential. In addition the formation of deposit in the reactor markedly decreases in the second stage.

On account of their good mechanical properties the copolymers are suitable, inter alia, for producing films, pipes, floor coverings, fibers, hollow bodies, injection-molded articles and molded parts for vehicle production.

EXAMPLES

EXAMPLE 1 a) Preparation of the Titanium-Containing Solid Component

In a first stage a solution of n-butyloctylmagnesium in n-heptane was added to $SiO_2$ having a particle diameter of 20 to 45 μm, a pore volume of 1.7 ml/g and specific surface of 330 m²/g, 0.3 mol of the magnesium compound being used per mole of $SiO_2$. The solution was stirred for 45 minutes at 40° C., then cooled to 20° C. following which the 10-fold molar amount, based on the organomagnesium compound, of hydrogen chloride was introduced. After 60 minutes 3 mol of ethanol per mole of magnesium were added to the reaction product, while stirring constantly. This mixture was stirred for half an hour at 80° C. and 7.2 mol of titanium tetrachloride and 0.3 mol of di-n-butyl phthalate dissolved in ethylbenzene, in each case based on 1 mol of magnesium, were added. The reaction mixture was then stirred for 1 hour at 100° C., and the resultant solid substance was filtered off and washed several times with ethylbenzene.

The solid product obtained was extracted for 3 hours at 125° C. with a 10% by volume solution of titanium tetrachloride in ethylbenzene. The solid product was then separated from the extracting agent by filtration and washed with n-heptane until the extracting agent contained only 0.3% by weight of titanium tetrachloride.

The titanium-containing solid component contained
3.6% by weight of Ti
7.7% by weight of Mg
24.9% by weight of Cl.

b) Pre-Activation of the Titanium-Containing Solid Component and Subsequent Deactivation 700 ml of n-heptane were placed in a 1 l capacity glass autoclave equipped with a stirrer and the reaction vessel was cooled to an internal temperature of 5° C. 47.4 ml of triethyl-aluminum (in the form of a 1.0 molar solution in n-heptane) and 1.3 ml of dimethoxyisobutylisopropylsilane (in the form of a 1.0 molar solution in n-heptane) were added to the solvent. 20 g of the titanium-containing solid component prepared according to Example 1a, were then added. After a contact time of 5 minutes gaseous, dry $CO_2$ was then continuously introduced (flow rate: 14.5 l/h at a pressure of 1 bar) for one hour through a feed tube into the catalyst suspension, while stirring. The polymerization-active catalyst suspension was thereby deactivated. 23.3 g of a solid were obtained.

c) Preparation of the Propylene-Ethylene Copolymer

The preparation of the propylene-ethylene copolymer took place in two series-connected stirred autoclaves each having a useful volume of 180 l, in the presence of hydrogen as molecular weight regulator. Both reactors contain a moved fixed bed comprising finely particulate polypropylene.

Gaseous propylene was introduced into the first polymerization reactor at a pressure of 32 bar and at a temperature of 80° C., and was continuously polymerized by means of a Ziegler-Natta catalyst. 1 g of the titanium-containing solid component prepared according to Example 1b), 60 mmol of triethyl-aluminum and 6 mmol of dimethoxyisobutyl-isopropylsilane were used as catalytic constituents per hour. The average residence time of the reaction mixture was 3 hours. With this process 0.4 kg of polypropylene was produced per millimole of the aluminum compound.

The polypropylene formed in the first reactor was transferred, together with the catalyst, to the second stirred autoclave, where a mixture of propylene and ethylene was incorporated by polymerization into the polymer in the presence of 80 mmol of isopropanol, at a total pressure of 15 bar, at 70° C., and with a mean residence time of 2.4 hours. The ratio of the partial pressures of propylene and ethylene was 2.3:1. The weight ratio of the polypropylene formed in the first reactor to the copolymer formed in the second reactor was 4.2:1. In the polymerization, in the second reactor 1.33 mmol of isopropanol were used per millimole of the aluminum component.

A propylene-ethylene copolymer having a melt flow index of 2.9 g/10 min at 230° C. and under a load of 2.16 kg (according to DIN 53 735) was obtained. The corresponding mechanical properties and particle size distribution of the copolymer formed are shown in the table below. The chlorine content in the copolymer was 13 ppm.

EXAMPLE 2

Propylene and ethylene were polymerized corresponding to the procedure described in Example 1 and using a Ziegler-Natta catalyst system, except that 1.2 mmol of isopropanol were used per millimole of the aluminum component. The ratio of the partial pressures of propylene and ethylene was 2.3:1. The weight ratio of the polypropylene formed in the first reactor to the copolymer formed in the second reactor was 4.3:1.

A propylene-ethylene copolymer having a melt index of 3.0 g/10 min at 230° C. and under a load of 2.16 kg (according to DIN 53 735) was obtained. The corresponding mechanical properties and the particle size distribution of the copolymer formed are shown in the table below. The chlorine content in the copolymer was 12 ppm.

EXAMPLE 3

Propylene and ethylene were polymerized corresponding to the procedure described in Example 1 and using a Ziegler-Natta catalyst system, except that 1.5 mmol of isopropanol were used per millimole of the aluminum component. The polymerization was carried out in the second reactor at a pressure of 20 bar and at a temperature of 70° C. The ratio of the partial pressures of propylene and ethylene was 2.0:1. The weight ratio of the polypropylene formed in the first reactor to the copolymer formed in the second reactor was 1.4:1.

A propylene-ethylene copolymer having a melt index of 1.3 g/10 min at 230° C. and under a load of 2.16 kg (according to DIN 53 735) was obtained. The corresponding mechanical properties and the particle size distribution of the copolymer formed are shown in the table below. The chlorine content in the copolymer was 9 ppm.

EXAMPLE 4

Propylene was polymerized in a first reactor corresponding to the procedure described in Example 3 and was transferred together with the catalyst to the second reactor, where a mixture of propylene and ethylene was incorporated by polymerization into the propylene homopolymer at a total pressure of 20 bar, at 70° C., and with an average residence time of 2.4 hours. The ratio of the partial pressures of propylene and ethylene was 2:1. The weight ratio of the polypropylene formed in the first reactor to the copolymer formed in the second reactor was 1.4:1.

A propylene-ethylene copolymer having a melt flow index of 1.3 g/10 min at 230° C. and under a load of 2.16 kg (according to DIN 53 735) was obtained. The corresponding mechanical properties and the particle size distribution of the copolymer formed are shown in the table below. The chlorine content in the copolymer was 7 ppm.

COMPARATIVE EXAMPLES V1 AND V2

Propylene-ethylene copolymers were prepared in a similar manner to the procedure described in Example 1 using the catalyst system according to Example 1a) though without pre-activation and without subsequent deactivation as described in Example 1b).

The reaction conditions and the properties of the propylene-ethylene copolymers are shown in the following table.

The melt indices were measured at 230° C. and under a load of 2.16 kg are according to DIN 53 735, the rigidities (shear modulus) were measured according to DIN 53 455, and the notched impact strengths were measured according to DIN 53 453 at −20° C.

TABLE

|  | Example 1 | Example 2 | Example 3 | Example 4 | Compar. Example V1 | Compar. Example V2 |
|---|---|---|---|---|---|---|
| 1st polymerization stage | | | | | | |
| temperature [°C] | 80 | 80 | 80 | 80 | 80 | 80 |
| pressure [bar] | 32 | 32 | 32 | 32 | 32 | 32 |
| 2nd Polymerization stage | | | | | | |
| temperature [°C] | 70 | 70 | 70 | 70 | 70 | 70 |
| pressure [bar] | 15 | 15 | 20 | 20 | 15 | 20 |
| Weight ratio of polypropylene | | | | | | |
| (1st stage) to copolymer (2nd stage) | 4.2:1 | 4.3:1 | 1.4:1 | 1.4:1 | 4.2:1 | 1.4:1 |
| Ratio of partial pressures propylene:ethylene (2nd stage) | 2.3:1 | 2.3:1 | 2.0:1 | 2.0:1 | 2.3:1 | 2.0:1 |
| Molar ratio isopropanol:aluminum component (2nd stage) | 1.33:1 | 1.2:1 | 1.5:1 | 1.33:1 | 0.9:1 | 1.1:1 |
| After the 1st stage: | | | | | | |
| Melt index [g/10 min] | 4.7 | 4.5 | 5.5 | 5.3 | 4.8 | 5.3 |
| Apparent density [g/l] | 415 | 420 | 410 | 395 | 400 | 400 |
| Fines (particle diameter <0.25 mm) [%] | 0.1 | 0.2 | 0.1 | 0.3 | 2.9 | 3.3 |
| After the 2nd stage: | | | | | | |
| Melt index [g/10 min] | 2.9 | 3.0 | 1.3 | 1.3 | 2.8 | 1.4 |
| Apparent density [g/l] | 415 | 435 | 420 | 430 | 420 | 425 |
| Rigidity [N/mm$^2$] | 540 | 530 | 235 | 245 | 530 | 235 |
| Notched impact strength [kJ/mm$^2$] | 7.9 | 6.8 | 0% fracture | 0% fracture | 6.7 | 0% fracture |
| Length of run without deposit formation [days] | — | — | >9 | >9 | — | <6 |
| Chlorine content [ppm] | 13 | 12 | 9 | 7 | 13 | 9 |

We claim:

1. A process for preparing a propylene-ethylene copolymer using a Ziegler-Natta catalyst system that contains a titanium-containing solid component and an aluminum compound as co-catalyst wherein the titanium-containing solid component is preactivated by reaction with the co-catalyst followed by deactivation of the preactivated catalyst system by reaction with carbon dioxide further followed by reactivation of the catalyst system by addition of the co-catalyst for effecting polymerization from the gaseous phase in an agitated fixed bed.

2. A propylene-ethylene copolymer obtained by a process as claimed in claim 1.

3. A method of using a propylene-ethylene copolymer as claimed in claim 2 for producing fibers, films and moldings.

4. Fibers, films and moldings produced from a propylene-ethylene copolymer as claimed in claim 2 as essential component.

* * * * *